(12) United States Patent
Combs et al.

(10) Patent No.: US 9,139,660 B2
(45) Date of Patent: Sep. 22, 2015

(54) ACETYLATION OF CELLULOSE IN DENSIFIED GAS

(75) Inventors: Michael T. Combs, Pembroke, VA (US); Raymond M. Robertson, Blacksburg, VA (US)

(73) Assignee: Celanese International Corporation, Irving, TX (US)

( * ) Notice: Subject to any disclaimer, the term of this patent is extended or adjusted under 35 U.S.C. 154(b) by 265 days.

(21) Appl. No.: 13/589,290

(22) Filed: Aug. 20, 2012

(65) Prior Publication Data

US 2013/0046089 A1 Feb. 21, 2013

Related U.S. Application Data

(60) Provisional application No. 61/525,506, filed on Aug. 19, 2011.

(51) Int. Cl.
*C08B 3/00* (2006.01)
*C08B 3/06* (2006.01)
*C08B 3/22* (2006.01)
*C08B 3/24* (2006.01)
*C08H 8/00* (2010.01)

(52) U.S. Cl.
CPC ... *C08B 3/00* (2013.01); *C08B 3/06* (2013.01); *C08B 3/22* (2013.01); *C08B 3/24* (2013.01); *C08H 8/00* (2013.01)

(58) Field of Classification Search
CPC .............. C08B 3/06; C08B 3/24; C08B 3/00; C08B 3/22; C08H 8/00
See application file for complete search history.

(56) References Cited

U.S. PATENT DOCUMENTS 1,822,563 A 9/1931 Burghart

OTHER PUBLICATIONS

Edgar, K.J., Cellulose Esters, Organic. Encyclopedia of Polymer Science and Technology, 2004, John Wiley & Sons, vol. 9, p. 129-158.*
Matsunaga et al., J. Wood Sci., 2010, 56, p. 293-298, Published online: Mar. 4, 2010.*
Takashi Nishino et al., "Acetylation of plant cellulose fiber in supercritical carbon dioxide", Polymer, vol. 52, 2011, pp. 830-836.
Daniel Pasquini et al., "Surface esterification of cellulose fibers: Characterization by DRIFT and contact angle measurements", Journal of Colloid and Interface Science, vol. 295, 2006, pp. 79-83.
International Search Report and Written Opinion mailed Nov. 23, 2012 in corresponding International Application No. PCT/US2012/051283.

* cited by examiner

*Primary Examiner* — Jonathan S Lau

(74) *Attorney, Agent, or Firm* — Kilpatrick Townsend & Stockton LLP

(57) ABSTRACT

Cellulose acetates and processes for producing same. The process involves esterifying a cellulose containing material in the presence of a densified gas such as supercritical carbon dioxide to form a cellulose acetate product having a degree of substitution less than 3. The cellulose acetate preferably is sulfate-free.

17 Claims, 2 Drawing Sheets

ACETYLATION OF CELLULOSE IN DENSIFIED GAS

CROSS REFERENCE TO RELATED APPLICATION

This application claims priority to U.S. Provisional Application No. 61/525,506, filed Aug. 19, 2011, the entire contents and disclosures of which are incorporated herein by reference.

FIELD OF THE INVENTION

The present invention relates generally to processes for producing cellulose acetate and, in particular, to acetylate cellulose in densified gas to produce cellulose acetate.

BACKGROUND OF THE INVENTION

Cellulose diacetate is the acetate ester of cellulose and is used for a variety of products, including textiles (e.g., linings, blouses, dresses, wedding and party attire, home furnishings, draperies, upholstery and slip covers), industrial uses (e.g., cigarette and other filters for tobacco products, and ink reservoirs for fiber tip pens, decking lumber), high absorbency products (e.g., diapers, sanitary napkins, and surgical products), thermoplastic products (e.g., photography film, plastic instruments, and tape), cosmetic and pharmaceutical (extended capsule/tablet release agents and encapsulating agent), medicinal (hypoallergenic surgical products) and others.

Cellulose diacetate typically has a degree of substitution (DS) of approximately 2.5 and is made commercially by a two-step reaction: (1) esterification and (2) hydrolysis. Esterification involves acetylating cellulose with acetic anhydride, acetic acid as a diluent and sulfuric acid as a catalyst. These reactants are mixed with cellulose until the DS reaches to about 3. Due to the exothermic nature of this reaction, temperature control is vital to ensure the final product parameters are met. After esterification, the catalyst concentration is neutralized and water is added to initial the hydrolysis reaction. The DS of the polymer is reduced from 3 to approximately 2.5.

Typically 2 to 15 wt. % of sulfuric acid is necessary per weight of starting cellulose material. The use of sulfuric acid in this process results in the production of derivatives having chemically bound acid sulfate group. Because these groups have a degrading effect on the cellulose acetate at elevated temperature, they must be inactivated by treatment with hard water or removed by steam. Also, by the end of the reaction, the sulfuric acid catalyst is neutralized by a metal salt and discarded. In addition, sulfuric acid is highly corrosive, difficult to handle, and can damage equipment.

The need exists for improved processes for producing cellulose acetate from raw materials, and in particular to processes for forming cellulose acetate that do not involve the use of sulfuric acid.

SUMMARY OF THE INVENTION

In a first embodiment, the present invention is directed to a process for producing a cellulosic ester product. The process comprising the steps of esterifying a cellulose containing material to form an intermediate cellulosic ester and de-esterifying the intermediate cellulosic ester to form the cellulosic product with the desired degree of substitution. The esterifying step of the cellulose containing material occurs in the presence of a densified gas with an esterifying agent under pressure to form an intermediate cellulosic ester having a first degree of substitution from 2.5 to about 3. Esterifying agent may comprise acetic anhydride, ketene, $C_{1-18}$ carboxylic anhydride, trifluoroacetic acid anhydride, $C_{1-18}$ carboxylic acid and mixtures thereof. Densified gas may include carbon dioxide, nitrogen, hydrofluorocarbons, methane, ethane, propane, ethylene, proplyene, 1,1-difluoroethane, 1,1,1,2-tetrafluorethane, and trifluoromethane. The esterifying step may occur in the presence of a catalyst, such as trifluoroacetic acid, alkyl sulfonic acids, aryl sulfonic acid, fluorinated alkylsulfonic acid, acetic acid, citric acid, ascorbic acid, tetrabutyl ammonium hydrogen sulfate, 4-(dimethylamino) pyridine, sodium carbonate, pyridine, potassium carbonate, sodium bicarbonate, tetrabutyl ammonium hydroxide, choline hydroxide, sodium acetate, potassium acetate, zinc acetate and ammonium acetate.

The de-esterification step occurs in the presence of the densifed gas, where the intermediate cellulosic ester is de-esterified with a de-esterifying agent to form the cellulosic ester product having a second degree of substitution, which is less than the first degree of substitution, such as from 0.1 to 2.9. De-esterifying agent may include water, methanol, ethanol, isopropanol, butanol, pentanol, isobutanol, R—OH, wherein R is from $C_1$ to $C_{20}$ alkyl group, and mixtures thereof.

In a second embodiment, the present invention is directed to a process for making cellulose acetate, comprising acetylating a cellulose containing material in the presence of an acid catalyst, an esterifying agent, and supercritical, near critical, or liquid carbon dioxide to form an intermediate composition; and de-esterifying the intermediate composition to form the cellulose acetate with a degree of substitution less than 3.

In a third embodiment, the present invention is directed to a sulfate-free cellulose acetate made using the process of the present invention.

BRIEF DESCRIPTION OF DRAWINGS

The invention is described in detail below with reference to the appended drawings, wherein like numerals designate similar parts.

DETAILED DESCRIPTION OF THE INVENTION

Introduction

Figure 1:
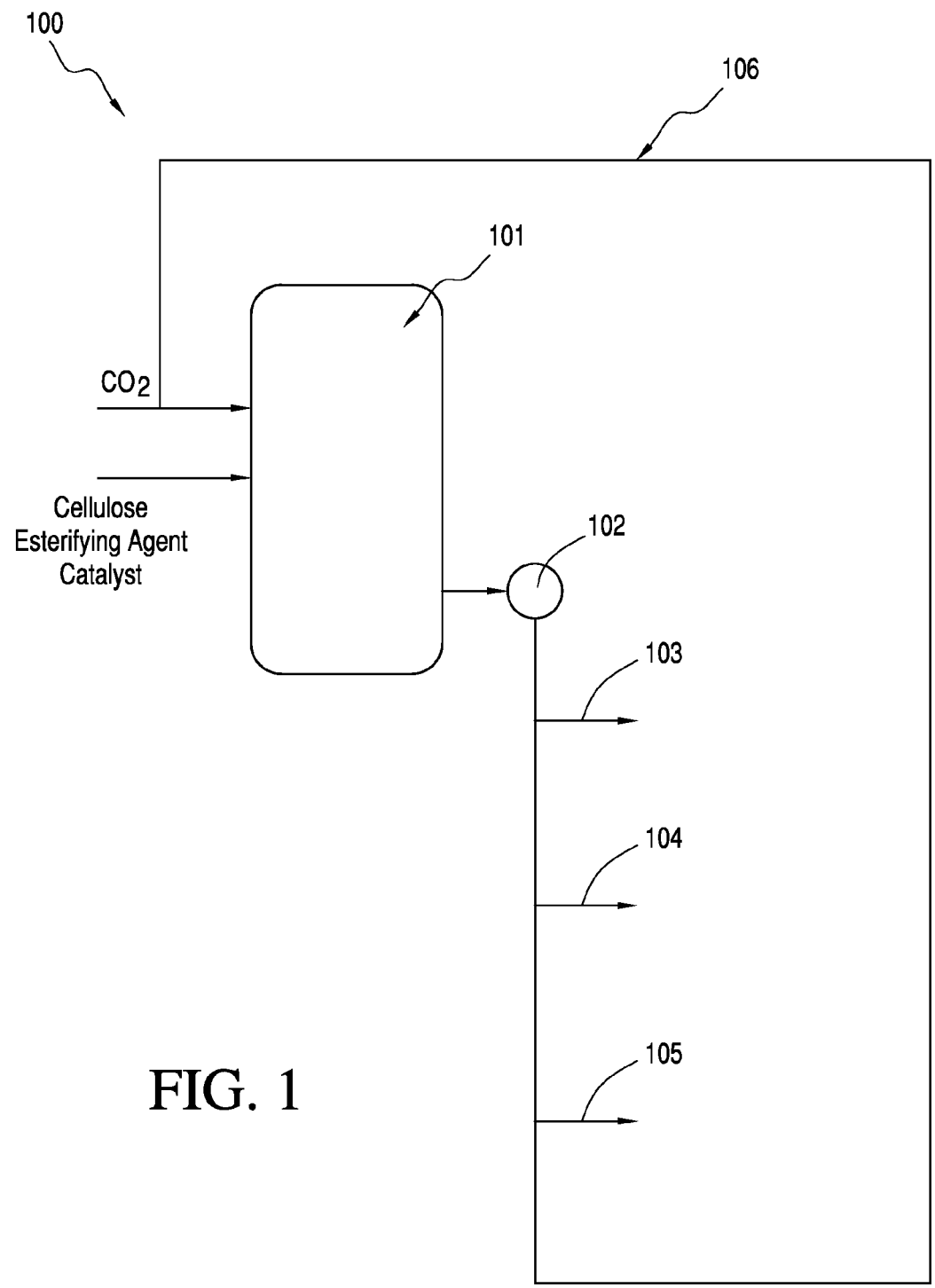
FIG. 1 is a schematic view of an esterification process suitable for practicing the present invention.

The present invention is directed to a two-step process of making cellulose acetate having a degree of substitution (DS) of 3 or less using a densified gas, which is a fluid that is gaseous at ambient condition. Densified gases may include, for example, liquefied gases, supercritical fluids or near supercritical fluids. In the first step, cellulose is acetylated in the presence of a solvent comprising the densified gas to form an intermediate cellulosic ester having a first DS that is preferably about 3, i.e., preferably from 2.5 to about 3. In the second step, the intermediate cellulosic ester is de-esterified, preferably with a de-esterifying agent, to a desired DS, typically from about 0.5 to about 2.9. Unlike traditional methods that involve the use of a sulfuric acid catalyst, the cellulose acetates manufactured by the methods of the present invention are preferably catalyzed with acids, such as trifluoroacetic acid, alkyl sulfonic acid, aryl sulfonic acid, fluorinated alkylsulfonic acid, acetic acid, citric acid, ascorbic acid; bases, such as tetrabutyl ammonium hydrogen sulfate, 4-(dimethylamino) pyridine, sodium carbonate, pyridine, potassium carbonate, sodium bicarbonate, tetrabutyl ammonium hydroxide, choline hydroxide; and acetate salts such as sodium acetate, potassium acetate, zinc acetate, and ammonium acetate in the presence of the densified gas. Thus, the methods of the invention may advantageously yield cellulose acetate that is substantially free of sulfate.

Conventional, cellulose acetate processes use sulfuric acid as the catalyst. Sulfate groups (R—$OSO_3H$) of sulfuric acid are acidic due to the second proton (pKa~1.9) and the acid proton must be neutralized. Otherwise, the acid proton readily catalyzes hydrolysis which degrades the product. This process leaves low levels of sulfate groups in the cellulose acetate polymer. Quenching the sulfuric acid catalyst with a salt (magnesium acetate, sodium acetate, potassium acetate) will neutralize the sulfate proton in conventional processes. For cellulose acetate an additional salt (calcium acetate or sodium acetate) is added in a post-treatment step to ensure neutrality and to buffer any sulfate groups that may hydrolyze to create a strong acid catalyst. Despite the quenching and post-treatment conventionally produced cellulose acetate may have an undesirable sulfate level that is greater than 60 wppm sulfate.

Thus, the present invention eliminates the need to precipitate the cellulose acetate with water. Moreover, one or more unreacted reagents advantageously may be collected and recycled, thereby reducing the need for waste treatment, reducing the environmental impact of the process, and reducing production cost by recovering raw materials.

Moreover, the present invention produces sulfate-free cellulose acetate. For example, the cellulose product of the present invention comprises less than 10 wppm sulfate, e.g., less than 1 wppm, or less than 0.1 wppm. In one embodiment, the sulfate-free cellulose acetate has a DS from 0.5 to 2.9. In another embodiment, the sulfate-free cellulose acetate has a DS from 2.35 to 2.55.

Esterification in Densified Gases

A typical process for acetylation of cellulose is by migration of reagents from the reaction medium into the cellulose structure, which can proceed at a relatively slow rate. A number of factors affect the reaction rate of a chemical reaction, including the nature of the reactants, physical state of a reactant, concentration, temperature, catalyst, and/or pressure. Without being bound by theory, it has now been discovered that densified gases such as supercritical fluids and near-supercritical fluids may facilitate the migration of the esterifying agent from the reaction medium into the cellulose structure since the density of the fluid approaches that of a liquid, but the diffusion is nearer that of a gas. Thus, the invention relates to esterifying cellulose with an esterifying agent in the presence of a densified gas such as supercritical carbon dioxide to form an intermediate cellulosic ester having a first DS, which is subsequently de-esterified with a de-esterifying agent to form a cellulose ester product having the desired (second) DS, which is less than the first DS.

Densified gases such as supercritical fluids and near-supercritical fluids typically have enhanced solvation powers. As used herein, a "supercritical fluid" is a fluid that is at a temperature and a pressure above its critical point. As used herein, the term "critical point" denotes the transition point at which the liquid and gaseous states of a substance merge with each other and represents the combination of the critical temperature and critical pressure for a given substance. The critical point for carbon dioxide occurs at 30.85° C. and 7.38 MPa. Thus, supercritical carbon dioxide exists at temperatures greater than 30.85° C. and pressures greater than 7.38 MPa. The term "near-supercritical fluid," as used herein, refers to fluids that are below either the critical temperature or critical pressure, but are above the critical point for either temperature and/or pressure while being at a sufficient pressure to contain the fluid. For example, carbon dioxide at 85° C. (above the critical temperature) and 6 MPa. Densified gas is used broadly herein to describe a fluid that is a gas at standard temperature and pressure (STP) that is pressurized such that the fluid density is higher than the corresponding gas at STP.

Supercritical fluids exhibit a high level of functionality and controllability that can influence not only the macrophysical properties of the fluid, but also influence nano-structures of molecules dissolved therein. The physical properties of supercritical fluids beneficially allow the esterifying reagent to penetrate the cellulose structure, thereby increasing the esterification rate of the cellulose structure.

It has now been discovered that the use of supercritical fluids, such as supercritical carbon dioxide, may reduce or eliminate the need to use catalyst in the reaction mixture. Typically, catalyst, such as sulfuric acid, causes the degradation of the polymers. Catalysts soluble in supercritical $CO_2$ may be used where the properties of the supercritical fluid can alter the molecular proximity of the catalyst to decrease glycosidic hydrolysis while accomplishing esterification of the hydroxyl group. The tuning of catalyst beneficially increases the molecular weight of the polymer, for example by at least 10%.

Supercritical fluids are readily compressible just above the critical temperature where small changes in pressure result in large changes in the density of the supercritical fluid. The "liquid-like" behavior of a supercritical fluid at higher pressures results in greatly enhanced solubilizing capabilities compared to those of the "subcritical" compound, with higher diffusion coefficients and an extended useful temperature range compared to liquids. As the pressure increases in a supercritical fluid, the solubility of the solute often increases by many orders of magnitude with only a small pressure increase.

Near-supercritical fluids also demonstrate solubility characteristics and other pertinent properties similar to those of supercritical fluids. Fluid "modifiers" can often alter supercritical fluid properties significantly, even in relatively low concentrations. In one embodiment, a fluid modifier may be added to the supercritical fluid. In this invention, acetic acid liberated from the esterification using acetic anhydride serves as an in-situ fluid modifier. In addition, the fluid soluble catalyst (e.g. trifluoroacetic acid) serves as a fluid modifier. These variations are considered to be within the concept of the present invention.

The use of supercritical fluids in the production of polymers as a swelling, foaming or purification agent is known from various sources. Supercritical fluids (1) serve to increase resin mobility thereby improving mixing and processing, (2) serve to reduce the polymer glass transition temperature by swelling, and enabling processing at lower temperatures, and (3) act as a solvent for impurities (including unreacted materials, by-products or residual conventional solvents), which may be removed during the processing to give high purity products. Moreover, the fluid can be used to aerate the polymer by transition to a non-critical gaseous state whereby a porous material may be obtained.

Examples of compounds which are known to have utility as supercritical fluids include, but are not limited to, carbon dioxide, ammonia, water, nitrous oxide, xenon, krypton, methane, ethane, ethylene, propane, pentane, methanol, ethanol, isopropanol, isobutanol, cyclohexanol, carbon disulfide, benzene, various fluorocarbons such as cholrotrifluoromethane, 1,1,1,2-tetrafluoroethane, trifluoromethane, 1,1-difluoroethane and monofluoromethane, toluene, pyridine, cyclohexane, decalin, cyclohexanol, o-xylene, and tetralin. The present invention contemplates the use of these compounds either separately or in combination. Additionally, it will be appreciated that solvents such as acetone, ketones, or ethers may be utilized in conjunction with the compounds listed above.

One compound that is particularly well suited for use with the present invention is carbon dioxide. Carbon dioxide is preferred because it is non-toxic, nonflammable, reasonably priced, and is easily separated or removed from the constituents used in making the cellulose acetate at the contemplated temperatures and pressures. Therefore, little or no residual carbon dioxide may remain in the finished product, e.g., cellulose acetate. Furthermore, due to the low cost, environmental acceptability, non-flammability, and low critical temperature of carbon dioxide and other densified gases, such as nitrous oxide, hydrofluorocarbons, tetrafluoroethane, trifluoromethane, 1,1-difluoroethane and others, these reagents are preferably employed in the present invention.

The step of esterifying the cellulose with an esterifying agent in the presence of a densified gas, e.g., supercritical or near-supercritical fluid, preferably occurs in a suitable pressure reactor 101, as shown in FIG. 1. The reactor may take the form of a tank (with or without mixing), a pipe, or a combination thereof. The reactor, regardless of its form, may be used as a continuous pressure reactor or as a batch pressure reactor. The pressure reactor may include, but is not limited to, a continuous stirred-tank pressure reactor, a plug flow pressure reactor, a semi-batch pressure reactor, a fixed bed pressure reactor or a catalytic pressure reactor. In a preferred embodiment, the process occurs in a Parr® reactor, as known to one of ordinary skill in the art.

During the esterification process 100, a cellulose starting material, an esterifying agent, and optionally a catalyst are added to a reactor 101 and preferably purged with a densified gas. The specific cellulose starting material employed may vary widely. A variety of cellulosic materials can be used as the starting material as well as blends of two or more cellulosic materials. In preferred embodiments, the cellulose starting material is selected from the group consisting of cotton linter, wood pulp, acetate grade wood pulp, viscose wood pulp, soy pulp, bamboo, starch, or other cellulose containing materials. In a preferred embodiment of the present invention, pre-treatment of the cellulose starting materials is not necessary. In some embodiments, the cellulose starting materials may be pretreated with water or acetic acid.

Esterification or esterifying, as used herein, refers to a chemical reaction during which an alcohol group of the cellulose and an esterifying agent form an ester as the reaction product. As used herein, the term "esterifying agent," refers to a chemical agent capable of reacting with the hydroxyl groups of the cellulose starting materials to form an ester, preferably an acetate. Suitable esterifying agents include acetic anhydride, ketene, $C_{1-18}$ carboxylic anhydride, trifluoroacetic acid anhydride, $C_{1-18}$ carboxylic acids and mixtures thereof. As indicated above, in preferred embodiments, the esterifying step forms an intermediate cellulosic ester having a DS approaching 3. As a result, the esterifying agent should be present in a molar amount that is at least three times greater than the number of hydroxyl groups on cellulose or moieties. In preferred embodiments, the molar ratio of esterifying agent to cellulose starting material in the reaction is at least 3:1, at least 4:1 or at least 5:1. In accordance with an embodiment of the present invention, an excess of the esterifying agent is used in the reaction mixture, for example, an excess of 30%, e.g., an excess of 20% or an excess of 15%. In this context, the term "excess" refers to an amount present in excess of the 3:1 esterifying agent:cellulose starting material molar ratio. Without being bound by theory the excess esterifying agent may react with the residual water on the cellulose.

As described herein, the use of a densified gas eliminates the requirement for sulfuric acid catalyst. In some embodiments, a catalyst may be employed with the densified gas. Suitable catalysts may be selected from trifluoroacetic acid, alkyl sulfonic acids, aryl sulfonic acid, fluorinated alkylsulfonic acid, acetic acid, ascorbic acid, sodium acetate, and zinc acetate. Although it is preferred that the catalyst does not comprise sulfuric acid, it is contemplated that in some embodiments, sulfuric acid may be employed as a secondary catalyst in combination with another catalyst such as trifluoroacetic acid. If present, the catalyst may be present in an amount ranging from 1 wt. % to 35 wt. %, e.g., from 5 wt. % to 30 wt. % or from 10 wt. % to 25 wt. %, based on the total weight of the esterification agent.

When sulfuric acid is used as a catalyst in the esterification of cellulose, the sulfuric acid reacts with the cellulose molecule thereby forming an esterified cellulose intermediate that has been at least partially sulfated. In such processes, as a result, the esterified cellulose intermediate is typically hydrolyzed to remove the sulfate moiety. In contrast, when trifluoroacetic acid is used in the preparation of cellulose acetate, it has been demonstrated that none of the trifluoroacetic acid remains on the cellulose backbone as compared to the sulfate group. The resulting cellulose acetate products may be isolated by simply removing the trifluoroacetic acid using solvents, such as the densified gas.

Although the specific reaction conditions employed may vary widely, depending, for example, on the densified gas that is used, the reaction preferably is run at a temperature from 40° C. to 200° C., e.g., from 80° C. to 110° C. or from 110° C. to 120° C., and at a pressure from 1.5 MPa to 35 MPa, e.g., from 20 MPa to 35 MPa, or from 9.6 MPa to 12 MPa. In some embodiments, the use of high temperature may drive the reaction without the use of catalysts. Supercritical carbon dioxide may be used as the densified gas and the reaction pressure preferably may be maintained from about 1.5 MPa to about 40 MPa, more preferably from about 3.5 MPa to about 15 MPa. In one embodiment, the esterifying step occurs at a pressure of at least 5 MPa, e.g., at least 7 MPa, or at least 9 MPa.

Overall reaction times may vary, but preferably range from about 15 to 300 minutes, e.g., from 30 to 200 minutes or from 45 to 100 minutes. In one embodiment, the reaction is conducted in the reactor without any stirring or mixing. In another embodiment, the reaction mixture may be agitated until the reaction is complete. In an embodiment, the reactor may be agitated from 15 minutes to 300 minutes, e.g., from 30 minutes to 200 minutes or from 45 minutes to 100 minutes. Agitation may be by shaking or stirring or by high velocity mixing, e.g., impingement mixing, without a stirring mechanism, recirculation of the densified gas and dissolved reactants, or by other conventional means known in the art.

Upon the completion of the reaction, cellulose triacetate is formed and any unreacted or excess starting materials including esterifying agent, catalyst, and densified gas may be isolated, purified and recycled. In accordance with an embodiment of the present invention, each of the unreacted or excess starting materials may be separated from the reaction mixture as a mixture and/or individually by adjusting the pressure of the reactor as illustrated in FIG. 1. For example, acetic anhydride, acetic acid (as byproduct), and trifluoroacetic acid may remain in the reaction mixture with the cellulose triacetate product and the densified gas. Each of these materials may be removed by changing the pressure of the pressure reactor, optionally in the reactor or in a separation vessel. In this manner, the use of a densified gas as solvent provides a simple and efficient separation means for separating components in the reaction mixture.

In one embodiment, as shown in FIG. 1, acetic anhydride 103 may be initially removed from the system via pump 102 by increasing the pressure of the reactor 101, e.g., to greater than 10 MPa. Then, acetic acid 104 and trifluoroacetic 105 may be removed similarly by changing the pressure of the reactor. Lastly, the densified gas (i.e. carbon dioxide) 106 may be collected and recycled.

In one embodiment, the recycled carbon dioxide is substantially pure, for example, at least 95% pure, e.g., at least 98% pure and at least 99% pure. Each of the isolated materials may be purified and optionally recycled to the process (either to the esterification step, the de-esterification step, or both). In one aspect, acetic acid 104 is purified and converted to acetic anhydride by the well-known ketene process, and the resulting acetic anhydride may be recycled to the reaction mixture for additional formation of cellulose acetate.

In another embodiment, upon the completion of the reaction, the unreacted or excess starting materials are removed from the pressure reactor and the cellulose acetate products in the pressure reactor are purged with the densified gas. The unreacted or excess starting materials may be recovered as discussed above.

In another embodiment of the invention, the separation order may be changed, depending on the solubility of the densifying gas and the reactants.

Additional densified gas may be added to the reactor to remove any soluble reactants or reaction byproducts that result from the esterification reaction. Upon removal of the densified gas, the cellulose triacetate product in the reactor is ready for the de-esterification step. The degrees of substitution of the cellulose acetate products may be determined by known techniques, such as tritration, NMR, TGA/IR, or other methods.

As stated above, unlike conventional methods, sulfuric acid is not used as a catalyst. As a result, the cellulose product made using this process is sulfate-free, e.g., the cellulose product comprises less than 10 wppm sulfate.

De-Esterification of Cellulose Triacetate

Figure 2:
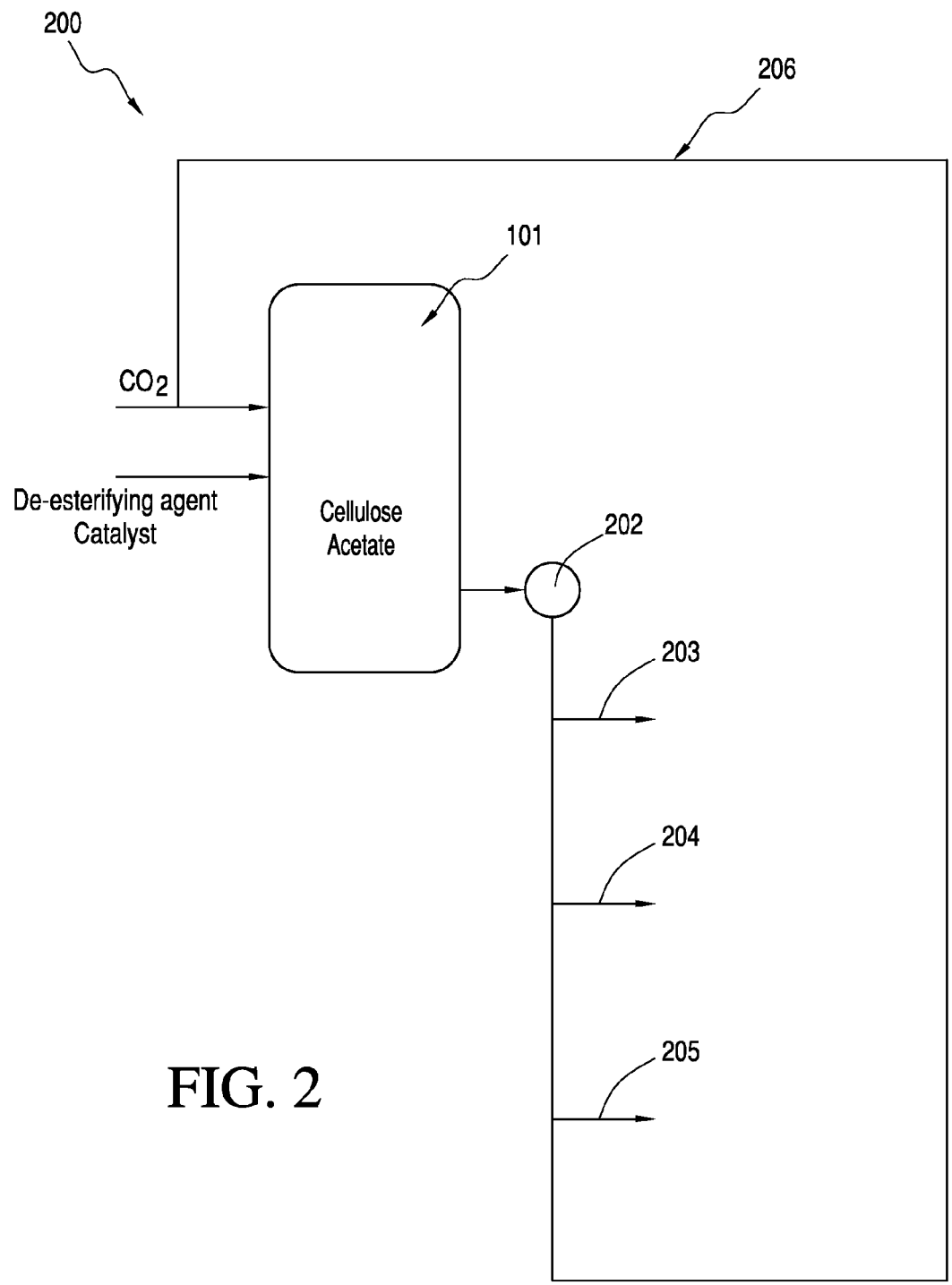
FIG. 2 is a schematic view of a de-esterification process suitable for practicing the present invention.

As discussed above, in the second step of the process of the invention, the intermediate cellulosic ester is de-esterified, preferably with a de-esterifying agent, to form a final cellulose acetate product having the desired DS, typically from about 0.5 to about 2.9. During the de-esterification step 200, as shown in FIG. 2, the intermediate cellulosic ester is de-esterified to form a final cellulose acetate product having a DS of less than 3, e.g., to a DS of less than 2.8 or to a DS of less than 2.6. In terms of ranges, the final cellulose acetate product may have a (second) DS ranging from 0.5 to 2.95, e.g., from 1.5 to 2.9 or from 2.5 to 2.9. The DS of the cellulose acetate affects its solubility, and depending on its solubility, cellulose acetate may be processed to make different end products. In the present invention, during the de-esterification process 200, cellulose acetate, a de-esterifying agent, and a catalyst are added to a reactor, optionally the same reactor used in the esterification step, and purged with the densifying gas, e.g., supercritical carbon dioxide. Optionally, the cellulose acetate is in the reactor 101 from the esterification step and the de-esterifying agent, catalyst and the densified gas are added to the reactor 101 during the de-esterification step. In one embodiment, the catalyst for de-esterification may not be the same as the catalyst for esterification. In another embodiment, the catalysts for esterification and de-esterification are the same.

De-esterification, as used herein, refers a chemical reaction during which one or more of the ester groups of the intermediate cellulosic ester are cleaved from the cellulose acetate and replaced with a hydroxyl group, resulting in a cellulose acetate product having a (second) DS of less than 3. "De-esterifying agent," as used herein, refers to a chemical agent capable of reacting with one or more of the ester groups of the cellulose acetate to form hydroxyl groups on the intermediate cellulosic ester. Suitable de-esterifying agents include low molecular weight alcohols, such as methanol, ethanol, isopropyl alcohol, pentanol, R—OH, wherein R is $C_1$ to $C_{20}$ alkyl group, and mixtures thereof. Water and a mixture of water and methanol may also be used as the de-esterifying agent.

Exemplary catalysts suitable for the de-esterification process include trifluoroacetic acid, alkyl sulfonic acids, aryl sulfonic acid, fluorinated alkylsulfonic acid, acetic acid, ascorbic acid, fluorinated carboxylic acid, fluorinated sulfonic acids, sodium acetate, ammonium acetate, and zinc acetate. In accordance with an embodiment of the present invention, the catalyst may be present in an amount from 0 wt. % to 35 wt. %, e.g., 5 wt. % to 30 wt. % or 10 wt. % to 25 wt. %. In a preferred embodiment, trifluoroacetic acid is used as the de-esterification catalyst. As indicated above, when trifluoroacetic acid is used in the preparation of cellulose acetate, unlike sulfuric acid, it does not bind to the cellulose and therefore the cellulose acetate products may be isolated by removing the trifluoroacetic acid using solvents, such as the densified gas. In addition, this may lead to the formation of a sulfate free cellulose acetate product.

In an embodiment of the present invention, the same or different catalysts may be used for the esterification process and the de-esterification process. For example, trifluoroacetic acid may be used in both of the esterification process and the de-esterification process. In another embodiment of the present invention, the catalyst recovered and purified from the esterification process may be used in the de-esterification process. Optionally, when the catalyst from the esterification process is substantially pure and is the same as desired for the de-esterification step, the catalyst used in the esterification process may also be used in the de-esterification step without separation and purification.

In preferred embodiments, the de-esterification step may occur at a reaction temperature ranging from 50° C. to 300° C., from about 100° C. to 250° C. or from 50° C. to 150° C. The densified gas may be maintained at a pressure from about 3.5 MPa to about 40 MPa, more preferably from about 5 MPa to about 14 MPa. In one embodiment, the de-esterifying step occurs at a pressure of at least 5 MPa, e.g., at least 7 MPa, or at least 9 MPa.

Overall reaction times may vary depending on reaction conditions, such as temperature and pressure, the DS of the intermediate and the desired DS of the final cellulose product. In one embodiment, the reaction time ranges from about 0.5 hours to 20 hours, e.g., from 1 hour to 15 hours or from 2 hours to 10 hours. Increase of temperature and/or manipulation of the pressure may reduce the reaction time.

In one embodiment, the reaction is conducted without mixing or stirring. In another embodiment, the reaction mixture may be agitated until completion, or until the desire DS is obtained. Agitating the reactor may reduce the time of the reaction. In one embodiment, the reactor may be agitated from between 0.25 hours to 15 hours, e.g., between 0.5 hours to 13 hours or between 0.75 hours to 10 hours. As a result of the de-esterification reaction, a final cellulose acetate product is formed having the desired DS. The DS of the cellulose acetate may be determined by using conventional methods, such as titration, NMR, IR, or NIR.

Upon the completion of the reaction, excess starting materials or byproducts (e.g., de-esterifying agent, catalyst, acetate, and densified gas) may be isolated, purified and recycled, similar to the esterification process. In accordance with an embodiment of the present invention, each of the unreacted or excess starting materials or byproducts may be separated from the reaction mixture by adjusting the pressure and/or the temperature of the reactor. For example, if methanol and trifluoroacetic acid are used as an de-esterifying agent and catalyst, respectively, methyl acetate is formed as a byproduct of the de-esterification process resulting in methanol, methyl acetate, and trifluoroacetic acid remaining in the reaction mixture with the cellulose acetate product and the densified gas upon completion of the reaction. Similar to the esterification step, each of these materials may be removed by changing the pressure and/or temperature of the reactor. In another embodiment, reactants and by-products may be removed from the reactor with the densified gas. These materials may be separated using methods such as multiple stage condensation, distillation, or other methods known in the art.

In an embodiment of the present invention, as shown in FIG. 2, methyl acetate 203 may be removed initially from the system via pump 202 by purging with densified gas. Trifluoroacetic acid 204 may be removed next from the system by further lowering the temperature and changing the pressure of the reactor. Acetic acid (or other catalyst) 205 may be removed next from the system by further lowering the temperature and changing the pressure of the reactor. Depending on the de-esterifying agent used, it may be removed from the reactor before or after trifluoroacetic acid and/or acetic acid. Lastly, the densified gas (e.g., carbon dioxide) 206 may be collected and recycled. In a preferred embodiment, the recycled carbon dioxide is substantially pure, for example, at least 95% pure, e.g., at least 98% pure and at least 99% pure. One or more of the materials isolated, e.g., the methanol (or other de-esterifying agent), methyl acetate (or derivative thereof), acetic acid (or derivative thereof), the trifluoroacetic acid (or other catalyst), or densified gas, may be purified and optionally recycled to the process (either to the esterification step, the de-esterification step, or both).

In one embodiment, the separated methyl acetate is hydrolyzed using water to form methanol and acetic acid. The resulting methanol and acetic acid may be separated and recycled to the process as desired. As discussed above, the acetic acid may be used to form acetic anhydride in the ketene process, which then may be used as the esterifying agent in the esterification step.

Additional densified gas, e.g., supercritical carbon dioxide, may be added to the reactor to facilitate removal of any soluble reactants or reaction byproducts that are formed from the esterification or de-esterification reactions. Upon removal of the densified gas, the final cellulose acetate product in the reactor preferably has the desired DS as discussed above.

In order that the invention disclosed herein may be better understood, an example is provided below. It should be understood that these examples are for illustrative purposes only and is not to be construed as limiting the invention in any manner.

EXAMPLE 1

Acetylation of Wood Pulp 1 gram of un-attrition wood pulp was charged to a 50 mL pressure reactor. 0.25 grams of trifluoroacetic acid (TFA) was added to the pressure reactor. 2.2 grams of acetic anhydride (15% stoichiometric excess) was added to the pressure reactor. The reactor was sealed and the reaction mixture was subject to static pre-treatment for 1.5 hour. After the pre-treatment, the reactor was heated to 120° C. and sufficient $CO_2$ was added to increase the pressure to 9.5 MPa. The reaction was held at these conditions for 90 minutes without stirring. A plasticized material was obtained.

Comparative Example 1 gram of un-attrition wood pulp as pretreated overnight with 2.53 mL acetic anhydride/TFA mixture (25% TFA in acetic anhydride) in a Parr reactor. After the pre-treatment, the reactor heated to 100° C. for 160 minutes.

The products in Example 1 and comparative example were analyzed for molecular weight and DS or percent combined acetic acid. A high performance liquid chromatographic method as described by Floyd in *J. Chromatogr.* 1993, Vol. 629, 243-254, was used for DS determination. Number average molecular weight (Mn), Weight average molecular weight (Mw) of commercial cellulose diacetate is provided as comparisons.

TABLE 1

Acetylation of Wood Pulp to Triacetate using Supercritical $CO_2$

|  | Mn | Mw | Mw/Mn | % Combined Acetic acid | DS |
| --- | --- | --- | --- | --- | --- |
| Triacetate Example 1 | 79000 | 122000 | 1.5 | 61 | 2.9 |
| Comparative Example | 47000 | 82000 | 1.7 | 61 | 2.9 |

Table 1 shows that the use of the method in accordance with the present invention results in a plasticized product with a greater Mn and Mw than a comparative product made without using supercritical $CO_2$. The use of supercritical $CO_2$ reduced molecular weight degradation of the polymer. As a result, the product in Example 1 has a lower polydispersity (Mw/Mn) than the product made without supercritical $CO_2$. It is postulated that the use of supercritical $CO_2$ produced polymers with a lower polydispersity that may offer material advantages for later processing.

Table 1 also provides a comparison of the triacetate Example 1 and commercial cellulose diacetate. As shown the triacetate product has a DS of 2.86, while the commercial cellulose diaceate has a DS of 2.48. The high substitution of the triacetate Example 1 demonstrates the complete forward reaction (61.9 being the theoretical maximum for triacetate), where this material can be used as triacetate or further processed for reduced DS.

EXAMPLE 2

Hydrolysis of Cellulose Diacetate

Example A 10 grams of cellulose commercially available diacetate was added to a 100 mL pressure reactor. 1 gram of trifluoroacetic acid and 2.5 grams of water were added to the reactor. The reactor was sealed and heated to 50° C. Sufficient $CO_2$ was added to increase the pressure to 7.4 MPa. The reactor was stirred at 45 rpm for 120 minutes.

Example B

Example A was repeated with a reaction time of 240 minutes.

The degree of substitution (DS) of Example A, Example, B and starting material using the method published by Floyd as described in Example 1.

TABLE 2

Hydrolysis of Cellulose Diacetate using Supercritical $CO_2$

|  | Reaction Time | % Combined Acetic Acid | DS |
| --- | --- | --- | --- |
| Commercial cellulose diacetate | n/a | 56 | 2.48 |
| Example A | 120 minutes | 54.5 | 2.38 |
| Example B | 240 minutes | 53.4 | 2.29 |

As shown in Table 2, supercritical $CO_2$ may be used with TFA (catalyst) and water to reduce the DS of cellulose diacetate. A linear regression of the data gives equation (1).

$$Y = -0.0452X + 2.4754 \tag{1}$$

Equation (1) illustrates that the DS of cellulose diacetate is reduced by 0.0452 DS/hour. Therefore, it is estimated that the hydrolysis time to reduce triacetate Example 1 (DS 2.86) to diacetate (DS 2.48) is 8.4 hours under the condition in Example A. The method allows the production of a highly controlled DS.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the invention and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the invention.

We claim:

1. A process for producing a cellulosic ester product, the process comprising the steps of:
   esterifying a cellulose containing material in the presence of a densified gas with an esterifying agent under pressure to form an intermediate cellulosic ester having a first degree of substitution; and
   de-esterifying the intermediate cellulosic ester with a de-esterifying agent, in the presence of the densified gas, to form the cellulosic ester product having a second degree of substitution, which is less than the first degree of substitution,
   wherein the densified gas is a near supercritical fluid or a supercritical fluid; and
   wherein the esterification and de-esterifying steps occur in the presence of a catalyst selected from a group consisting of trifluoroacetic acid, alkyl sulfonic acids, aryl sulfonic acid, fluorinated alkylsulfonic acid, acetic acid, citric acid, ascorbic acid, tetrabutyl ammonium hydrogen sulfate, 4-(dimethylamino) pyridine, sodium carbonate, pyridine, potassium carbonate, sodium bicarbonate, tetrabutyl ammonium hydroxide, choline hydroxide, sodium acetate, potassium acetate, zinc acetate and ammonium acetate.

2. The process of claim 1, wherein the first degree of substitution is from 2.5 to about 3.

3. The process of claim 1, wherein the densified gas is selected from a group consisting of carbon dioxide, nitrogen, hydroflorcarbons, methane, ethane, propane, ethylene, proplyene, 1,1-difluoroethane, 1,1,1,2-tetrafluorethane, and trifluoromethane.

4. The process of claim 1, wherein the esterifying agent comprises an anhydride.

5. The process of claim 1, wherein the esterifying agent is selected from a group consisting of acetic anhydride, ketene, $C_{1-18}$ carboxylic anhydride, triflouroacetic acid anhydride, $C_{1-18}$ carboxylic acid and mixtures thereof.

6. The process of claim 1, wherein the esterifying step occurs at a pressure of at least 5 MPa.

7. The process of claim 1, further comprising:
   reducing the pressure of the reaction system; and
   recovering and recycling at least a portion of the densified gas.

8. The process of claim 7, further comprising adding additional densified gas to the reaction to extract soluble materials prior to reducing the pressure of the reaction system.

9. The process of claim 1, wherein the catalyst is recovered and recycled to the de-esterifying step.

10. The process of claim 1, wherein the esterifying step is conducted at a temperature from 30° C. to 200° C.

11. The process of claim 1, wherein the second degree of substitution is from 0.5 to 2.9.

12. The process of claim 1, wherein the second degree of substitution is from 2.35 to 2.55.

13. The process of claim 1, wherein the de-esterifying agent is selected from a group consisting of water, methanol, ethanol, isopropanol, butanol, pentanol, isobutanol, R—OH, wherein R is from $C_1$ to $C_{20}$ alkyl group, and mixtures thereof.

14. The process of claim 1, wherein the de-esterifying step occurs at a pressure of at least 5 MPa.

15. A process for making cellulose acetate, comprising:
   acetylating a cellulose containing material in the presence of an acid catalyst, an esterifying agent, and near supercritical fluid carbon dioxide or supercritical fluid carbon dioxide to form an intermediate composition; and
   de-esterifying the intermediate composition with a de-esterifying agent in the presence of the acid catalyst and the near supercritical fluid or the supercritical fluid carbon dioxide, to form the cellulose acetate with a degree of substitution less than 3,
   wherein the acid catalyst is triflouroacetic acid.

16. The process of claim 15, wherein the esterifying agent comprises an anhydride.

17. The process of claim 15, further comprising recovering and recycling the carbon dioxide.

* * * * *